Patented June 23, 1936

2,045,057

UNITED STATES PATENT OFFICE 2,045,057

TREATMENT OF HYDROCARBON OILS

Walter A. Schulze, Bartlesville, Okla., assignor to Phillips Petroleum Company, Bartlesville, Okla., a corporation of Delaware No Drawing. Application September 6, 1934, Serial No. 743,027

4 Claims. (Cl. 196—24)

This invention relates to the improvement of hydrocarbon fluids through the removal of carbon sulfides from such fluids. It includes both the method of accomplishing the improvement and the products formed.

It is commonly recognized that carbon disulfide and/or carbon oxysulfide are present to a smaller or greater extent in hydrocarbon oils or spirits produced in the distillation of coal and other carbonaceous materials. Industrial gases such as coke oven gas, coal gas, carburetted water gas and producer gas are all likely to contain these sulfur compounds. Also, sulfur-bearing petroleum oils which have been subjected to high cracking or reforming temperatures are liable to contain these carbon sulfides. Since these particular sulfur compounds are comparatively inert, their removal from such hydrocarbon oils or gases cannot be accomplished by treatment with the refining agents generally employed in the industry for the removal of hydrogen sulfide, mercaptans, and the like. Hitherto, the removal of these deleterious sulfur compounds has been attempted through the use of catalysts at high temperatures (vapor phase) or by some such complex means, the result being high costs and ordinarily very incomplete removal.

One of the objects of the present invention is to remove the carbon disulfide from liquid hydrocarbons at ordinary temperature and pressure by a greatly simplified method. Another object is to remove these carbon sulfides very completely from either hydrocarbon oils or gases. Other objects include the process for producing hydrocarbon fluids substantially free of carbon disulfide, and the production of a new chemical compound formed in the interaction between morpholine and carbon disulfide.

I have discovered that when morpholine is added to a hydrocarbon oil containing carbon disulfide, a flocculent white precipitate forms immediately. The removal of this compound which is quite insoluble in the ordinary hydrocarbon oils leaves the oil substantially free of carbon disulfide. Since morpholine is miscible with hydrocarbon oils it may be added directly to the oil in any amount desired up to several percent by volume. Therefore, there is no need for the usual contacting apparatus employed in treating with immiscible solutions.

The precipitate which is formed in the reaction between the carbon disulfide in the oil and the morpholine is believed to be merely the addition compounds as exemplified below.

One molecule of morpholine reacts with one molecule of carbon disulfide to give morpholyl dithionic acid.

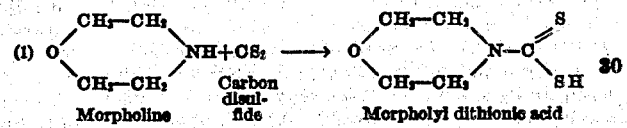

The acid then reacts with another molecule of morpholine (base) to give a salt

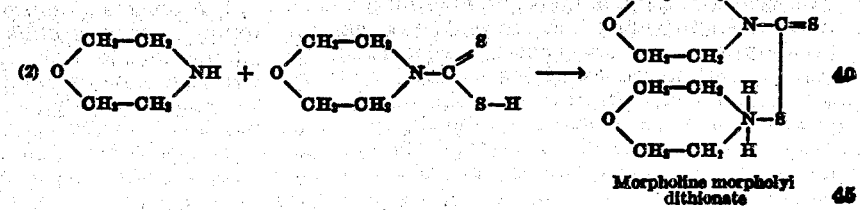

Whatever its constitution, however, a precipitate is formed, and this precipitate may be removed from the oil by any one of the well known methods for separating solids from liquids.

I have discovered also that the reaction of the carbon disulfide with the morpholine and the resulting precipitation of the morpholine morpholyl dithionate from the hydrocarbon solutions is not instantaneous but takes place over a period of one to several hours. Therefore, if the oil is filtered after only several minutes reaction time has elapsed, it will be noticed that a further quantity of the morpholine-carbon disulfide compound is subsequently precipitated. So if complete removal of the carbon disulfide is desired a reaction period of one to several hours at ordinary temperatures is allowed. This time can, of course, be shortened by first raising the temperature to complete the reaction rapidly and then cooling in order to hasten the precipitation.

I have found that the precipitate which is formed in the interaction of carbon disulfide and morpholine is quite insoluble in naphthas, gasolines, benzene and other hydrocarbon oils but readily soluble in water. I have taken advantage of this ready solubility in water and often employ a water wash to remove the last traces of the compound from hydrocarbon oils instead of waiting for the precipitation from the solution to be completed. In this way it is possible with a minimum of apparatus and in a short time to produce oils which are completely free of carbon disulfide.

Two moles of morpholine per mole of carbon disulfide is required to form the morpholine salt as shown in Equation 2. If a lower ratio of morpholine to carbon disulfide is used, some of the morpholyl dithionic acid (Equation 1) will be present along with the morpholine morpholyl dithionate and unreacted carbon disulfide. This acid is apparently soluble in water and can be removed by a water wash. Hence when one molecular equivalent of morpholine is added to a naphtha containing carbon disulfide, somewhat more than one half of a molecular equivalent of carbon disulfide is removed by the filtration and subsequent water washing steps.

In the treatment of hydrocarbon oils an excess of morpholine may be added if desired and such unreacted morpholine removed from the hydrocarbon oil by subjecting the latter to a water wash or even to a dilute acid treatment. This morpholine may then be recovered from the water or from its salt in the acid solution by any one of the usual methods.

At ordinary temperatures the morpholine morpholyl dithionate is a comparatively stable compound which permits ease of handling. It can be treated, however, e. g. at elevated temperatures, for the recovery of substantial quantities of both morpholine and carbon disulfide. The morpholine recovered in this way can be used repeatedly, thereby making the process more economical.

In treating gases for removal of carbon sulfides I have found that due to the high vapor pressure of morpholine in the pure state it is advantageous to use a dilute solution of morpholine in some high boiling inert solvent, e. g. gas oil or absorption oil. In general, a wide range of solvents may be employed, those of low volatility being preferred. In this way the amount of morpholine carried from the solution by the gases can be greatly reduced. The morpholine in the treated gases in any instance can, of course, be recovered by any one of a number of methods, e. g. by simply cooling the gases, or washing such gases with water and/or dilute acid.

Various homologues of morpholine can, of course, be used without departing from the spirit or scope of this invention. Some of these substances, if produced economically, offer special advantages, for example, those with boiling points considerably higher than morpholine are much less volatile and can be used more conveniently in the removal of carbon sulfides from gases.

The following examples illustrate the invention as applied to the particular case of morpholine and carbon disulfide.

*Example 1.*—Two molecular equivalents of morpholine was added to a light naphtha containing 0.357 percent carbon disulfide. Precipitation of the morpholine morpholyl dithionate began immediately. After standing several hours at room temperature, the compound was filtered from a portion of the naphtha. A determination of the total sulfur content of the naphtha showed the carbon disulfide to have been lowered from 0.357 percent to 0.003 percent.

After filtering off the precipitated morpholine compound, a portion of the naphtha was given a water wash to dissolve out the remaining traces of the compound. A sulfur test then showed that no carbon disulfide remained in this naphtha.

*Example 2.*—One percent by volume of morpholine was added to a gasoline to which had been added 0.357 percent of carbon disulfide. After standing several hours at room temperature a portion of the gasoline was filtered, water washed, and tested for carbon disulfide by means of the lamp sulfur method. No carbon disulfide sulfur was found.

*Example 3.*—One percent by volume of morpholine was added to a naphtha containing 0.357 percent of carbon disulfide. After standing several days the precipitate was filtered off, and the naphtha tested to see whether any trace of carbon disulfide could be found. The lamp sulfur showed no carbon disulfide. The very sensitive qualitative test employing copper sulfate and ethyl amine (Industrial and Engineering Chemistry, Analytical edition 4, 146 (1932)) likewise developed no color, so it is apparent that the carbon disulfide was completely removed.

*Example 4.*—A gas containing considerable carbon disulfide was passed through a solution of morpholine in gas oil. Morpholine morpholyl dithionate separated out of the gas oil. The treated gas gave a negative test for carbon disulfide.

I claim:

1. A process of improving hydrocarbon oil containing carbon disulfide, comprising adding morpholine to said oil to react with the carbon disulfide, and separating the carbon disulfide-morpholine reaction products from the oil.

2. A process of improving hydrocarbon oil containing carbon disulfide, comprising adding morpholine to said oil to react with the carbon disulfide, whereby the reaction product is substantially completely precipitated from the oil, and separating the carbon disulfide free oil from the precipitate.

3. A process of improving hydrocarbon oil containing carbon disulfide, comprising adding morpholine to said oil in an amount slightly greater than twice the molecular equivalent of the carbon disulfide in the oil, removing the precipitate which is formed in the reaction of the morpholine with the carbon disulfide, and washing the oil with water to remove the excess morpholine and the last traces of the carbon disulfide-morpholine reaction compounds from the thereby purified oil.

4. A process of improving hydrocarbon oil containing carbon disulfide in concentrations below one per cent, comprising adding morpholine to said oil in an amount slightly greater than twice the molecular equivalent of the carbon disulfide in the oil, removing the precipitate which is formed in the reaction of the morpholine with the carbon disulfide, and washing the oil with water to remove the excess morpholine and the last traces of the carbon disulfide-morpholine reaction compounds from the thereby purified oil.

WALTER A. SCHULZE.